July 22, 1969  A. F. GOODWIN  3,456,554
PULSE COUNTER AND BURST LIMITER
Filed Jan. 2, 1968  2 Sheets-Sheet 1

INVENTOR
ARTHUR F. GOODWIN
BY
Harry C. Burgess
ATTORNEY

July 22, 1969

A. F. GOODWIN 3,456,554

PULSE COUNTER AND BURST LIMITER

Filed Jan. 2, 1968

INVENTOR

ARTHUR F. GOODWIN

BY *Harry C. Burgess*

ATTORNEY

United States Patent Office 3,456,554
Patented July 22, 1969

3,456,554
PULSE COUNTER AND BURST LIMITER
Arthur F. Goodwin, Essex Junction, Vt., assignor to General Electric Company, a corporation of New York
Filed Jan. 2, 1968, Ser. No. 695,096
Int. Cl. F41d 11/10
U.S. Cl. 89—135                    4 Claims

ABSTRACT OF THE DISCLOSURE

A pulse counter for limiting the number of rounds fired in a burst from an automatic weapon. Pulses from the weapon, each indicative of a round being fired, are fed into a gate which feeds a first monostable multivibrator. The first monostable multivibrator activates a constant current source which charges a storage capacitor through a variable resistor. The amount of charge stored per pulse is a function of this variable resistor which is set to correspond to a predetermined number of pulses. The voltage on the storage capacitor is monitored by a unijunction transistor which fires an SCR. The SCR feeds current to the latch coil of a magnetically latched relay which, when operated, inhibits further firing of the weapon being controlled, until the relay is automatically or manually unlatched. A second monostable multivibrator is provided which stores each pulse as it is received from the input gate for a period of time less than the minimum time between rounds. The presence of a pulse stored in the second monostable multivibrator inhibits the input gate thereby desensitizing the system to any noise pulses which might occur during this period.

BACKGROUND OF THE INVENTION

This invention relates to systems for counting electrical pulses. More specifically, the invention relates to pulse counting systems for adaptation to automatic weapons whereby the number of rounds in a burst are limited to a predetermined quantity.

Mechanical systems for limiting the number of rounds in a burst from an automatic weapon are well known. Such systems, however, generally require mechanical linkages, cams, etc. which must be specially built into the particular weapon.

Accordingly, it is an object of the invention to provide a burst limiter which can be readily adapted to any automatic weapon without special mechanical hardware.

Electrical pulse counting systems, on the other hand, are extremely sensitive to extraneous noise signals. This characteristic detracts from their application to automatic weapons since bolt noise, brass chips hitting the electrical firing circuit, etc., may be improperly counted.

Accordingly, it is a further object of this invention to provide an electrical pulse counter which is relatively insensitive to extraneous noise signals.

SUMMARY OF THE INVENTION

The invention provides for the reception and storage of input pulses on an accumulative basis and the detection of the accumulated pulses until a predetermined number have been accumulated. Additionally, each pulse is separately stored for a period of time less than the minimum possible time between input pulses and the input to the system is rendered inoperative during this period of time.

BRIEF DESCRIPTION OF THE DRAWINGS

While the specification concludes with claims particularly pointing out what is considered to be the invention, reference to the drawings and specifications will illustrate a specific embodiment thereof.

DESCRIPTION OF A PREFERRED EMBODIMENT

Figure 1:
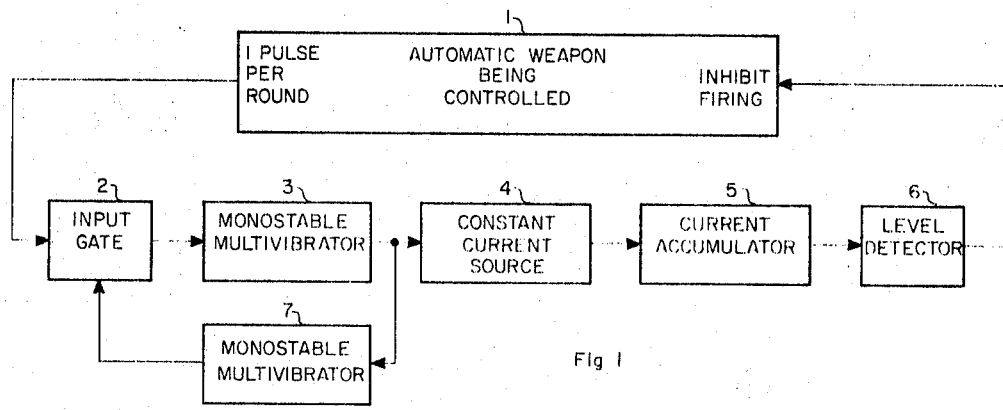
FIGURE 1 is a block diagram of a specific embodiment of the invention.

Referring now to FIGURE 1, there is shown an automatic weapon 1 which generates one electrical pulse each time a round is fired. This pulse may be, for example, taken directly from the firing circuit if the weapon is electrically fired or may be the output of an electromechanical transducer in the case of a conventional mechanically operated weapon. These pulses are relayed to one input of an input gate 2. The output of input gate 2, when operative, is relayed to the input of a first monostable multivibrator 3. Monostable multivibrator 3 sets upon the reception of a pulse from input gate 2 and stays set for a predetermined fixed time. Setting the monostable multivibrator 3 activates constant current source 4 whose output is fed into a current accumulator 5. At the same time, the activation of the first monostable multivibrator 3 activates a second monostable multivibrator 7. The second monostable multivibrator 7 also stays set for a predetermined time, this time being fixed at some time less than the minimum possible time between input pulses. In one application, for example, the pulses indicative of rounds fired can never occur oftener than once every 9 milliseconds. In this application, the monostable multivibrator 7 stays set for 7 milliseconds.

The output monostable multivibrator 7 is fed to a second input of input gate 2. This input renders the input gate 2 inoperative during the time that monostable multivibrator 7 is set and, as will be seen later, acts to desensitize the system to extraneous noise pulses. Since the output of constant current source 4 is fed to current accumulator 5, the pulses fed into the system will be continuously accumulated in current accumulator 5. The contents of current accumulator 5 are examined by a level detector 6 and, when the contents reaches a predetermined amount indicative of the desired number of rounds, level detector 6 operates in inhibit further firing of the weapon being controlled. It should be noted that the activation of level detector 6 also serves, in the present embodiment, to discharge the contents of current accumulator 5, thereby resetting the system for subsequent use.

Accordingly, it is seen that monostable multivibrator 3, constant current source 4 and current accumulator 5 act as first storage means to store input pulses on a cumulative basis. In addition, monostable multivibrator 7 acts as a second storage means to store each pulse individually for a predetermined time less than the minimum possible time between pulses.

After level detector 6 operates to inhibit further firing of automatic weapon 1, the system may be either automatically or manually reset so as to resume operation.

Figure 3:
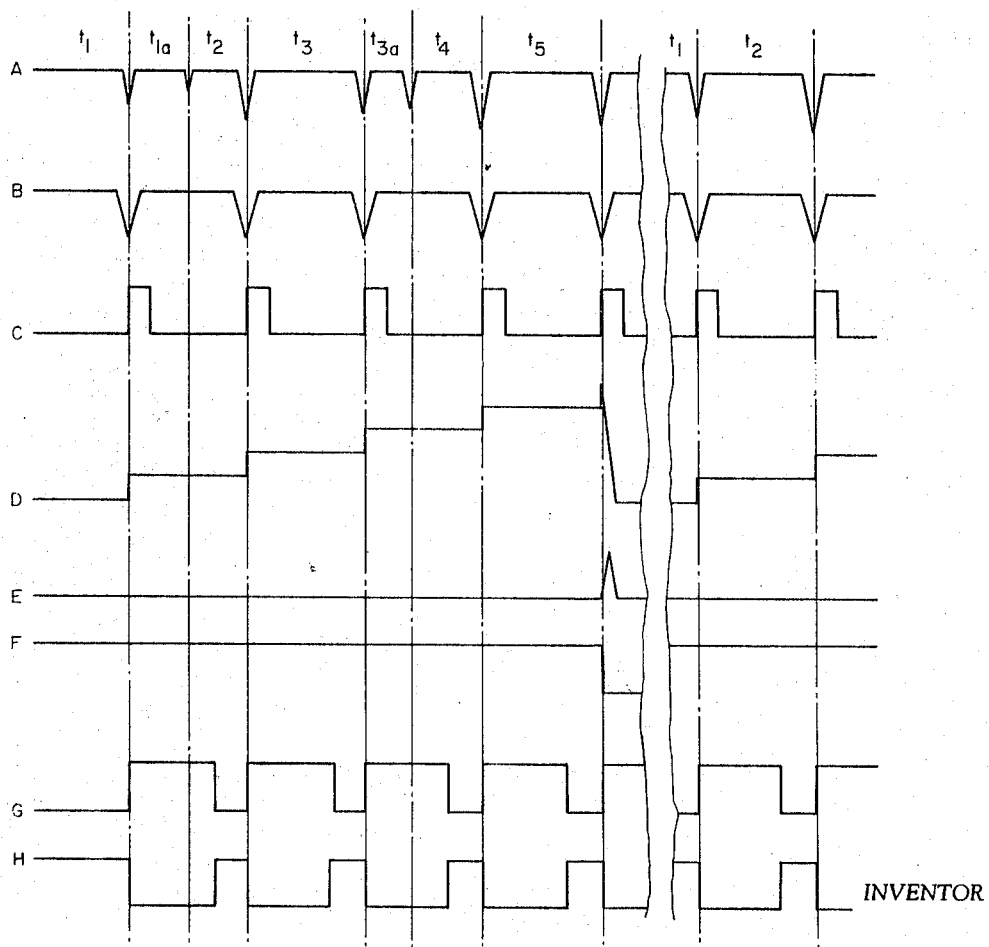
FIGURE 3 is a timing diagram illustrating waveforms during the operation of the system shown in FIGURE 2.
Figure 2:
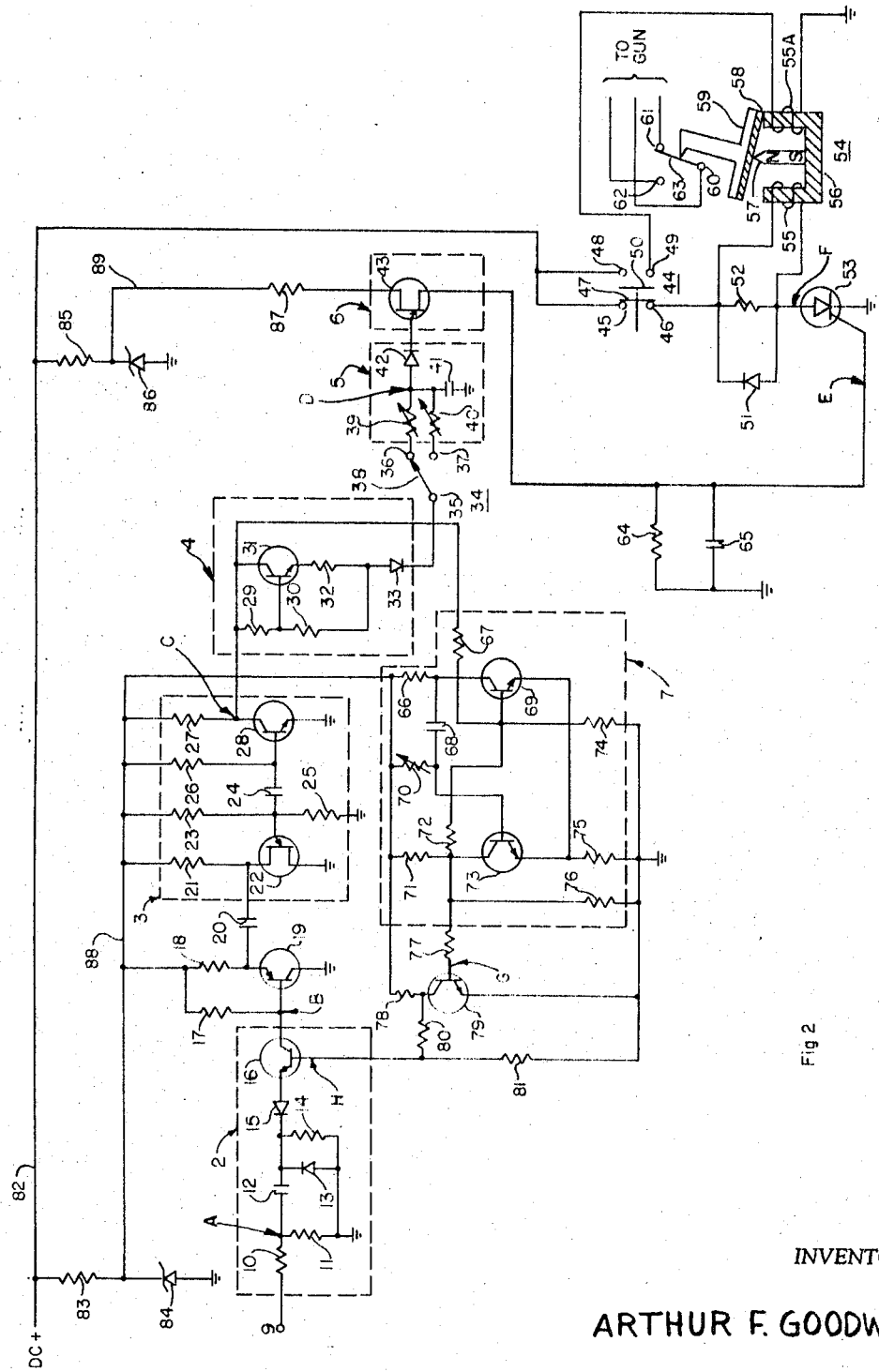
FIGURE 2 is a schematic diagram of the specific embodiment shown in FIGURE 1.

Referring now to FIGURE 2, there is shown at 2, the input gate described above. Resistors 10 and 11 form a voltage divider network connected to input capacitor 12 and blocking diode 15. Also provided are clamping diode 13 and resistor 14, both connected to ground. As shown in FIGURE 3, the presence of an input pulse at input terminal 9 causes a negative voltage spike at the junction of the resistors 10 and 11, as shown by A in FIGURE 3. Assuming, for the time being, that the base of NPN transistor 16 is at a positive voltage, the pulse shown at time T1 will be relayed through NPN transistor 16 to the base of PNP transistor 19 as shown at B in FIGURE 3. The presence of a negative pulse at the base of transistor 19 causes it to conduct through resistor 18 thereby triggering monostable multivibrator 3 through trigger capacitor 20. Hence, the purpose of transistor 19 and its associated resistors 17 and 18 is to shape the output of gate 2 so as to trigger monostable multivibrator 3.

The system is shown with a main DC input bus 82 which may come, for example, from a full wave rectifier or other DC source and may be, for example, 28 volts DC. Resistor 83 is connected to DC bus 82 and to one lead of Zener diode 84 whose other lead is grounded. The junction of resistor 83 and Zener diode 84 form a second, DC bus of a lower voltage, for example, 18 volts DC. A third DC bus 89 is similarly generated at the junction of resistor 85 and Zener diode 86.

Monostable multivibrator 3 is composed of a unijunction transistor 22 which is coupled to the DC bus 88 by resistor 21 along with resistors 23 and 25, resistor 26 and capacitor 24, which determines the on-time of the multivibrator. The output of the multivibrator is derived from the collector of NPN transistor 28 which is connected to the DC bus 88 by resistor 27. A monostable multivibrator constructed in this fashion is well known in the art and is shown, for example, in General Electric Transistor Manual, 7th edition, Figure 13.55, pp. 340–341. The presence of a negative pulse at the base of the unijunction transistor causes the monostable multivibrator to set and results in the waveform shown at C in FIGURE 3. After the predetermined time constant is satisfied, the monostable multivibrator 3 returns to its "off" or reset state.

The output of the monostable multivibrator 3 is fed to activate the constant current source shown at 4, comprised of NPN transistor 31, resistors 29, 30, 32 and diode 33. Resistors 29 and 30 form a voltage divider network connected to the base of transistor 31. This network controls the base voltage as a function of the output voltage across the resistor 32. Hence, current through diode 33 will be constant in magnitude and pulse width, the magnitude being determined by this operation of the constant current source; the pulse width by the "on" time of monostable 3. Diode 33, on the other hand, presents reverse leakage.

The current pulses from constant current source 4 are fed to a two position selector switch generally shown at 34. While a two position selector switch is shown, it is understood that any number of positions, depending upon the particular application, could be used. Two position selector switch 34 has an input terminal 35 connected to the movable arm 38 which contacts alternately terminals 36 or 37. With the switch in the position shown, current pulses from constant current source 4 are fed through the switch to one side of adjustable resistor 39. The other side of adjustable resistor 39 is connected to storage capacitor 41 so that current pulses relayed from constant current source 4 will be stored by capacitor 41. The voltage stored per pulse is, of course, a function of the value of adjustable resistor 39. Adjustable resistor 40, connected to terminal 37 of switch 34 is also connected to storage capacitor 41. Storage capacitor 41 is connected by diode 42 to the emitter of unijunction transistor UJT 43. The function of unijunction transistor 43 is to detect the unmber of pulses stored in capacitor 41. As is well known, a unijunction transistor will not conduct until such time as the emitter voltage is raised to some percentage of the base-to-base voltage, known as the peak point or threshold voltage. Hence, in the two resistor systems shown, the first resistor might be set, for example, so that the voltage stored per input pulse would be ⅕ of the threshold voltage of UJT 43 and accordingly would stop firing after 5 rounds. The second, for example, might be set to store ½₀ of the UJT threshhold voltage, stopping firing after 20 rounds. It is of course, understood that any number of preset adjustable resistors could be used to provide as many settings as desired for the particular application.

DC voltage bus 89 is fed through resistor 87 to one base of unijunction transistor 43. The other base is fed through resistor 64 to ground, thereby establishing the base-to-base voltage of the unijunction transistor 43. When the capacitor has stored a sufficient number of pulses to exceed the threshhold voltage of unijunction 43, as shown, for example, at T5 in FIGURE 3, unijunction 43 will conduct thereby transmitting a pulse to the gate electrode of a silicon controlled rectifier SCR 53. This causes SCR 53 to conduct from the main DC supply bus 82 to ground. Connected between the SCR 53 and the DC bus are two normally closed contacts 45, 46 of a switch shown generally at 44, whose function will be explained later. In series with these contacts is current latching resistor 52 which has blocking diode 51 and latch coil 55 in parallel with it.

To inhibit further firing after SCR 53 conducts, there is provided a magnetically latched relay shown generally at 54. This relay consists of a U-shaped base shown generally at 56 with two coils 55 and 55A wound on the legs of the core. A permanent magnet, 57, is positioned between the two legs so as to provide a pivot point for a contact actuator which is composed of a base of magnetic material 58 connected to an actuating arm 59 of non-metallic material. When the relay is actuated by one of its coils, it pivots toward that coil and is magnetically latched in this position by virtue of the closed magnetic path from permanent magnet 57, through the base 58 of the contact actuator and then through the magnetic core 56. Energization of the latch coil 55 actuates the relay 54 and causes the contact actuator to pivot about the permanent magnet 57 and latch in the actuated state. When the contact actuator pivots in this position, movable contact arm 63 which is connected to stationary contact 60 is forced out of contact with stationary contact 61 and into contact with stationary contact 62. Leads from conacts 60, 61, 62 go to the automatic weapon to inhibit firing when the relay is actuated. The relay 54 then latches in this position until power is supplied to the unlatch coil 55A. In the embodiment shown, unlatch coil 55A is actuated by the pushbutton generally shown at 44. Pushbutton 44 has two sets of contacts, the first being normally closed from terminal 45 to terminal 46 by contact element 47 and the second being normally open from terminal 48 to terminal 49 by contact element 50. Operating the pushbutton 44 causes movable element 50 to close the circuit from terminal 48 to terminal 49 thereby supplying voltage from the DC bus 82 to the unlatch coil 55 thereby unlatching magnetic relay 54. At the same time, movable contact 47 opens the circuit from terminals 45 to 46 thereby turning off SCR 53. It should be noted that, in the instant application, the SCR 53 is fed from a DC source.

There is also shown in FIGURE 2, a second monostable multivibrator 7. This second multivibrator 7 is activated by an output pulse from the first multivibrator 3 which is relayed through resistor 67 to the base of NPN transistor 69, which is connected to DC bus 88 through resistor 66, causing NPN transistor 69 to turn on. Turning on NPN transistor 69 causes NPN transistor 73, which is connected to DC bus 88 through resistor 71 to turn off. Capacitor 68 then begins to charge through variable resistor 70 until the voltage on the base of NPN transistor 73 reaches a level sufficient to turn NPN transistor 73 on. When NPN transistor 73 turns on, the voltage at its collector is lowered, thereby turning off transistor 69 through resistor 72. The amount of time during which transistor 73 is off is determined by the RC time constant established by variable resistor 70 and capacitor 68. Therefore, the setting of variable resistor 70 determines the on time of the monostable multivibrator.

When monostable 7 is "on," the voltage at the collector of NPN transistor 73 is raised thereby turning on NPN transistor 79 through its base resistor 77. Turning NPN transistor 79 on causes the voltage at its collector, which is connected to DC bus 88 by resistor 78, to drop, thereby lowering the voltage through resistor 80 at the base of NPN transistor 16. When NPN transistor 79 is turned on, the base voltage of the NPN transistor 16 is lowered to the point where it cannot conduct. Hence, input gate 2 is blocked so long as monostable multivibrator 7 is set.

Referring to FIGURE 3, there is shown a timing diagram illustrating the operation of the invention. The presence of an input pulse at time T1 as illustrated at A results in triggering monostable multivibrator 3 through PNP transistor 19. As is shown at C, multivibrator 3 stays on for a predetermined time, thereby relaying constant current pulses to the storage capacitor 41 which accumulates this voltage as shown at D. At the same time, monostable multivibrator 7 sets thereby turning on transistor 79 as shown at G and reducing the base voltage of transistor 16 as shown at H. At some time later, denoted T1a, a noise pulse occurs. Since the base voltage of transistor 16 is held at a low level, the input gate 2 is blocked and consequently the pulse at T1a is not relayed to the base of transistor 19 as shown at B in FIGURE 2. Similarly at time T2, the first multivibrator 3 again turns on, storing additional voltage on the storage capacitor as shown at D and once again initiating the blocking of input gate 2. The pulse shown at T3 is similarly accumulated at the noise pulse shown at T3a is, in a fashion similar to that which occurred at T1a, blocked. Voltage continues to accumulate on storage capacitor 41 until T5 at which time the unijunction transistor 43 conducts, thereby transmitting a trigger pulse to the gate of SCR 53 as shown at E. This turns SCR 53 on as shown at F and activates relay 54 which inhibits further firing of the weapon being controlled. As shown by the broken lines, the system must then be reset and operation resumes as previously shown.

What I claim as new and desire to secure by Letters Patent of the United States is:

1. A weapons system comprising:
    an automatic weapon for serially firing rounds of ammunition and having a known first minimum time interval between successive rounds; and
    a rounds monitoring and firing interlock system including:
        means for generating a pulse in correlation to a round being fired;
        a gate having an input terminal coupled to said pulse generating means for receiving pulses therefrom and having an output terminal and an inhibit terminal;
        a first monostable multivibrator having an input terminal coupled to said gate output terminal and adapted to be set by a pulse received therefrom, and having an output terminal;
        a second monostable multivibrator having an input terminal coupled to said first monostable multivibrator output terminal and adapted to be set by a pulse received therefrom, and having an output terminal coupled to said gate inhibit terminal;
        said second monostable multivibrator, having a second known set interval which is less than but approaches said known first minimum time interval between successive rounds, whereby when a pulse is passed through said gate it sets said first monostable multivibrator which sets said second monostable multivibrator which blocks said gate for said second known interval and unblocks said gate prior to the termination of said first known interval and the earliest possible arrival of the next pulse generated in correlation to a round being fired;
        pulse accumulating and monitoring means having an input terminal coupled to said first monostable multivibrator output terminal for receiving pulses therefrom and having an output terminal, and adapted to generate a signal when a predetermined number of pulses have been accumulated; and
        firing inhibit means coupled to said automatic weapon and having an input terminal coupled to said pulse accumulating and monitoring means for receiving the signal therefrom and for inhibiting further firing of said automatic weapon.

2. A weapons system according to claim 1 wherein said pulse accumulating and monitoring means includes:
    a constant current source in series with and for charging a current accumulator and gated on by an output pulse from said first monostable multivibrator; and
    a current level detector coupled to said current accumulator for monitoring the charge in said accumulator and for providing an output pulse at said output terminal when the charge reaches a predetermined level.

3. A weapons system according to claim 2 wherein:
    said current accumulator comprises a storage capacitor, and
    said level detector comprises a unijunction transistor responsive to the voltage across said capacitor.

4. A process for firing a burst of a predetermined number of rounds of ammunition from an automatic weapon having a known first minimum time interval between successive rounds, said process comprising:
    generating a pulse in correlation to the firing of each round;
    passing the pulse through a gate to a pulse accumulator;
    in response to a pulse passing through the gate, blocking the gate for a known second time interval which is less than but approaches said known first minimum time interval whereby the gate is open shortly before the next pulse can possibly be generated in response to the firing of the next successive round; and
    accumulating pulses passed through the gate and generating a signal to halt the firing of the weapon in response to the predetermined number of pulses having been accumulated.

References Cited

UNITED STATES PATENTS

| | | | |
|---|---|---|---|
| 2,833,919 | 5/1958 | Stephens | 328—181 |
| 3,217,601 | 11/1965 | Gardner | 89—135 |
| 3,226,568 | 12/1965 | Samwel | 307—247 X |
| 3,257,567 | 6/1966 | Kotas | 307—228 |
| 3,263,565 | 8/1966 | Dragonetti et al. | 89—135 X |
| 3,378,698 | 4/1968 | Kadah | 307—227 X |

BENJAMIN A. BORCHELT, Primary Examiner

S. C. BENTLEY, Assistant Examiner

U.S. Cl. X.R.

307—227, 247, 273; 328—73, 99, 192